(No Model.)

R. N. ALLEN.
CAR WHEEL.

No. 293,211. Patented Feb. 12, 1884.

Witnesses:
Henry Eichling
Robt F. Gaylord

Inventor
Richard N. Allen
by Robt H. Duncan
atty.

UNITED STATES PATENT OFFICE.

RICHARD N. ALLEN, OF CLEVELAND, OHIO.

CAR-WHEEL.

SPECIFICATION forming part of Letters Patent No. 293,211, dated February 12, 1884.

Application filed July 28, 1883. (No model.)

*To all whom it may concern:*

Be it known that I, RICHARD N. ALLEN, of the city of Cleveland, in Cuyahoga county, in the State of Ohio, have invented a new and useful Improvement in Car-Wheels, of which the following is a specification.

The present invention, like that for which Letters Patent No. 268,378, were granted to me on the 5th day of December, 1882, relates particularly to the manner in which the tire is secured to the single central plate, which, in connection with the hub, forms the body of the wheel. In that construction parts of the central plate, near its periphery, were formed and arranged to fit into corresponding parts upon the inner edge of the tire, thereby constituting the tongue-and-groove lock described and claimed in said patent. In the present invention the tire is secured to the central plate by the use of an additional tongue-and-groove lock formed upon an inwardly-projecting annular web of the tire, and the face of the central plate, and by bolts or rivets passing through the web of the tire and the central plate.

Figure 1:
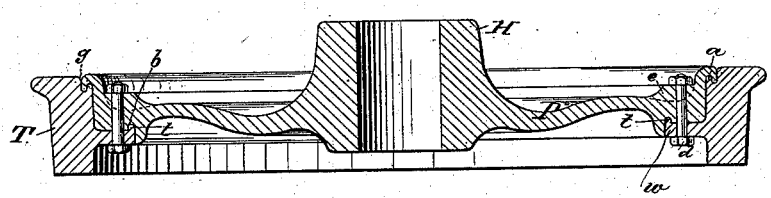
Figure 2:
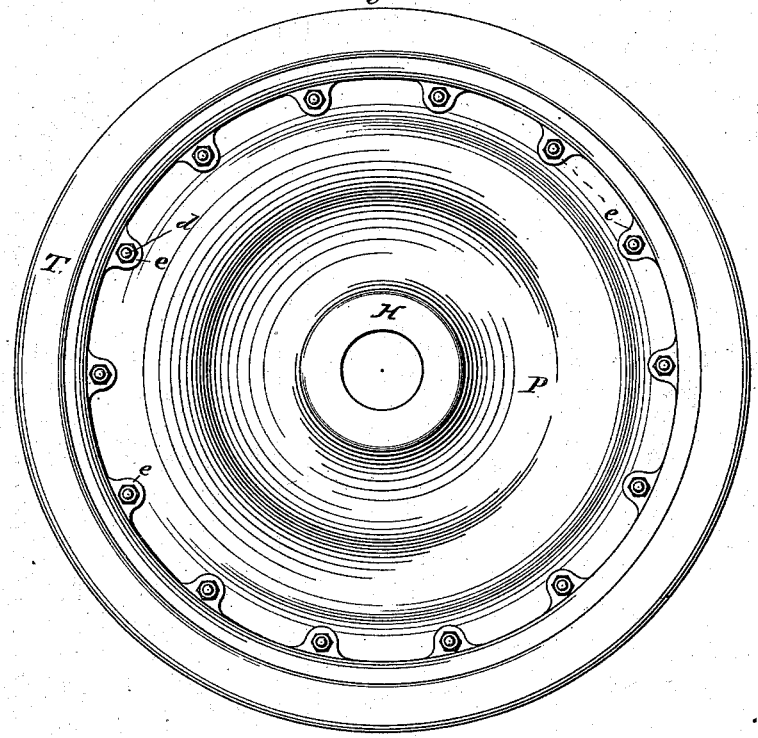

The invention is illustrated in the accompanying drawings, in which Figure 1 is a central cross-section of a car-wheel containing my improvement, and Fig. 2 is a view in elevation of the inner side or face of the same.

In the drawings, T represents the tire of the wheel, which is provided with an annular web, $w$, projecting toward the center of the wheel, such web being provided with a laterally-projecting annular tongue, $t$, preferably located near its periphery. The inner edge of the tire is also provided with an annular tongue or projection, $a$, and an annular groove, $g$.

P represents the central plate, and H the hub of the wheel, which preferably form a single piece or casting, and may be forged from wrought-iron or cast from iron or steel. The plate P, near its periphery, is provided with a tongue and groove to correspond with the tongue $a$ and groove $g$ upon the inner edge of the tire, and it is also provided upon its outer face with a groove, $b$, to correspond with the tongue $t$ upon the web of the tire. The web $w$ is preferably located nearer the outer than the inner edge of the tire, so as to leave a wide bearing for the tire upon the periphery of the central plate, and the outer face of the central plate opposite the web is preferably recessed to receive the web. The recess may, however, be dispensed with, and the web may simply overlap the periphery of the central plate, and then, by locating the web nearer the outer edge of the tire, a broader bearing of the tire upon the periphery of the central plate may be obtained.

It will of course be understood that the parts described are to be of such relative proportions that when the tire and central plate are brought together the tongue $t$ on the web will enter and fit into the groove $b$ in the central plate, and the tongue and groove upon the inner edge of the tire will engage with the corresponding tongue and groove of the central plate at its periphery, forming two tongue-and-groove locks, while the periphery of the central plate and the inner face of the tire are in contact from the web to the inner edge of the tire, as fully shown in the drawings.

It is obvious that in place of the lock formed upon the web of the tire and the central plate, as hereinbefore described and shown in the drawings, an equivalent lock might be formed by a tongue projecting laterally from the face of the central plate and entered into a groove in the web of the tire. After the tire and the central plate have been brought together, as above described, they are firmly united by a series of bolts, $d$, passed through the web $w$ and the plate P near its periphery. To compensate for the weakening of the plate at this part by the bolt-holes, as well as to give it additional strength to resist the blows communicated through the tire, a series of bosses or re-enforcements, $e$, equal in number to the bolts, may be formed upon the inner face of the plate P, through which the holes are bored; or the same end may be obtained by thickening the metal of the plate near the tire and boring the bolt-holes through such thickened part.

Instead of bolts $d$, a series of rivets may be used to unite the tire and the central plate.

The construction of the tire and the body of the wheel are so related to each other that the tire can be forced into place upon the periphery of the central plate by hydraulic or other requisite pressure, the corresponding tongues and grooves in each part being so located and constructed to make close joints.

From the above description it is readily seen that a new tire can be easily and quickly substituted for a broken or worn one by simply removing the bolts or rivets, forcing the old tire off and a new one on, and replacing the bolts.

If desired, the lock upon the inner edge of the tire and the central plate may be omitted, and the periphery of the central plate be simply extended out flush, or nearly so, with the inner edge of the tire. In such construction the lock upon the web of the tire and the face of the central plate will greatly lessen the liability and danger that the bolts or rivets would be sheared or cut off between the web and the central plate in case the tire should become broken; but I prefer to double lock the tire to the central plates, as shown in the drawings.

I am aware that English Patent No. 1,098 of March 25, 1875, shows a construction of wheel in some respects similar to that herein described. A careful examination of said patent, however, indicates that said wheel belongs to the class of spoke-wheels, and is very unlike the plate-wheel herein described and claimed, it being, like its class, provided with a felly to which both the spokes and the tire are secured, while the wheel herein described has its tire secured directly to its central plate. The wheel of the said English patent also employs a supplemental ring for securing the tire to the felly, and it has no tongue-and-groove lock by which a web projecting from the tire is united to the outer face of a central plate, (or to the felly in the English wheel,) which feature is made an important element of construction in the present patent.

What is claimed as new is—

1. A car-wheel composed of a hub, a single central plate, and a tire provided with an inwardly-projecting web, in which the tire and the central plate are secured together by two tongue-and-groove locks, one formed upon the web and the outer face of the central plate, and the other upon the central plate and the inner edge of the tire, and by bolts passed through the central plate and the web of the tire.

2. A car-wheel composed of a hub, a single central plate, and a tire provided with an inwardly-projecting web, in which the tire is secured to the central plate by a tongue-and-groove lock formed upon the web of the tire and the outer face of the central plate, and by bolts passed through the central plate and the web of the tire.

RICHARD N. ALLEN.

Witnesses:
FREDERICK S. SMITH,
C. P. BEAUMONT.